United States Patent [19]

Motley

[11] Patent Number: 4,869,298

[45] Date of Patent: Sep. 26, 1989

[54] WIRE FENCE TAKE UP DEVICE

[76] Inventor: Marvin D. Motley, 28818 SE. 216th Way, Maple Valley, Wash. 98038

[21] Appl. No.: 185,478

[22] Filed: Apr. 25, 1988

[51] Int. Cl.[4] ............................................... B21F 9/00
[52] U.S. Cl. ............................... 140/102.5; 140/123.5
[58] Field of Search ..................... 140/93.2, 102.5, 69, 140/123, 123.5, 104; 7/117

[56] References Cited

U.S. PATENT DOCUMENTS

| 399,946 | 3/1889 | Taylor et al. | 140/102.5 |
| 507,454 | 10/1893 | Rogers | 140/102.5 |
| 510,477 | 12/1893 | Graham | 140/102.5 |
| 548,420 | 10/1895 | Bauer | 140/102.5 |
| 681,251 | 8/1901 | Nigg | 140/102.5 |
| 913,590 | 2/1909 | Waller | 140/102.5 |
| 1,463,870 | 8/1923 | Campbell | 140/102.5 |
| 2,879,808 | 3/1959 | Mallory | 140/123.5 |
| 4,485,852 | 12/1984 | Frazier | 140/118 |

FOREIGN PATENT DOCUMENTS 63892 10/1955 France ................................. 140/123

*Primary Examiner*—Robert L. Spruill
*Attorney, Agent, or Firm*—Delbert J. Barnard

[57] ABSTRACT

A device for removing slack in a wire of a fence that includes a spring actuated plunger axially mounted in a shaft having a handle on one end and a head with spaced apart prongs on the other end. The prongs are rotated and twisted to take up slack in and to secure a wire, and the plunger moves the unit away from the wire.

15 Claims, 3 Drawing Sheets

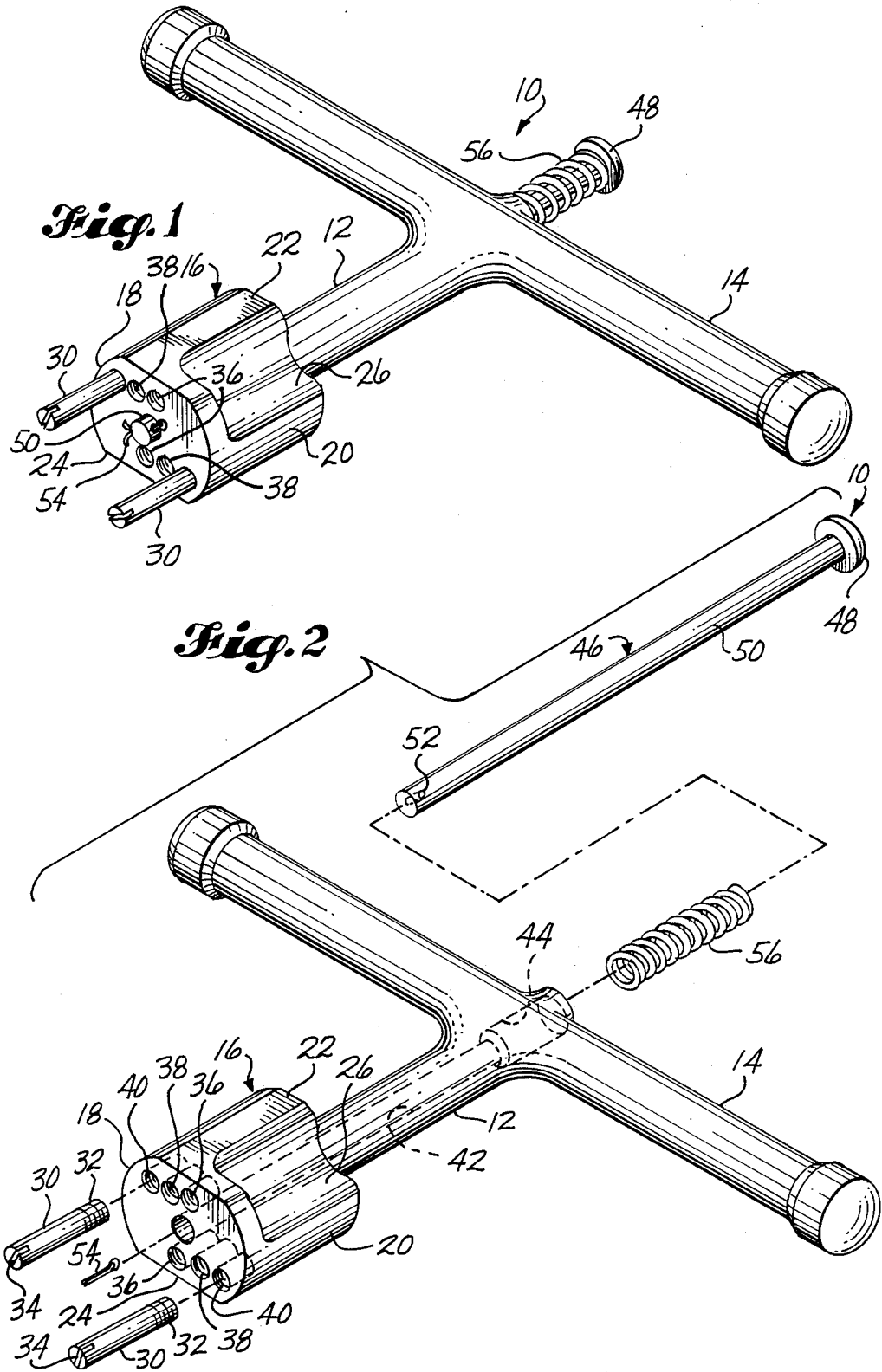

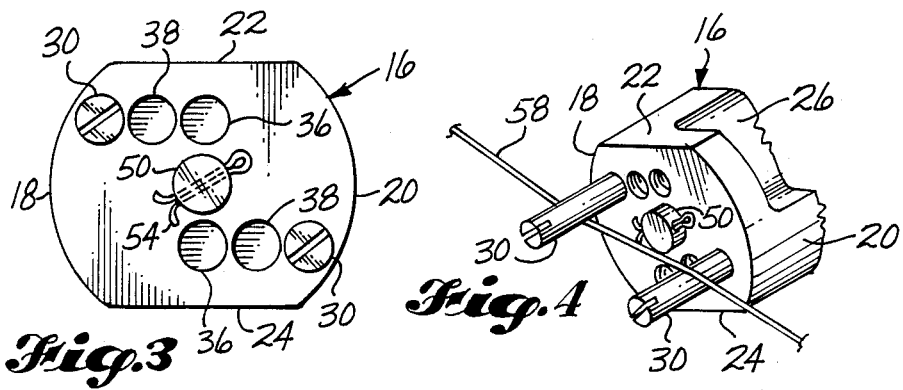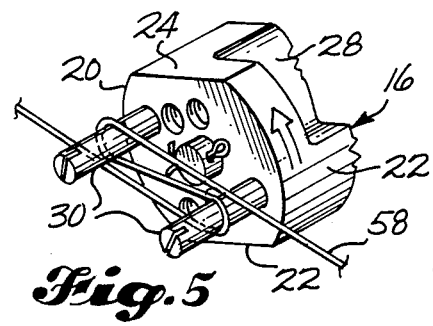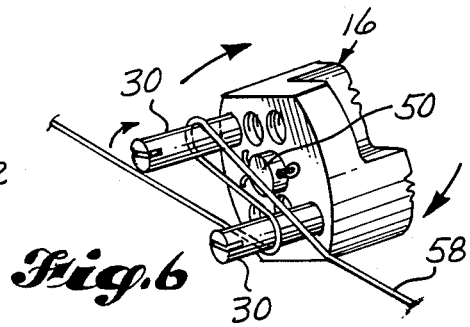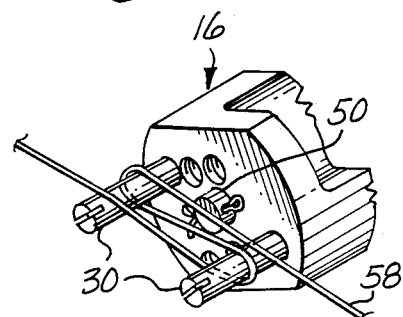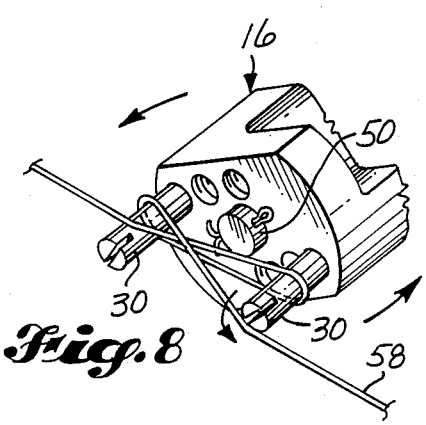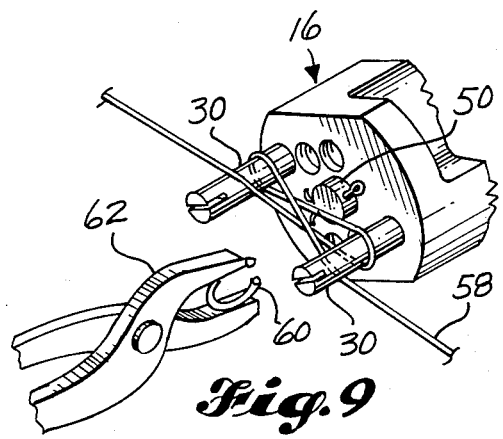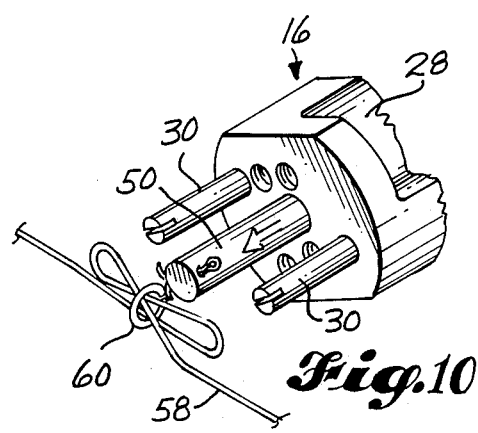

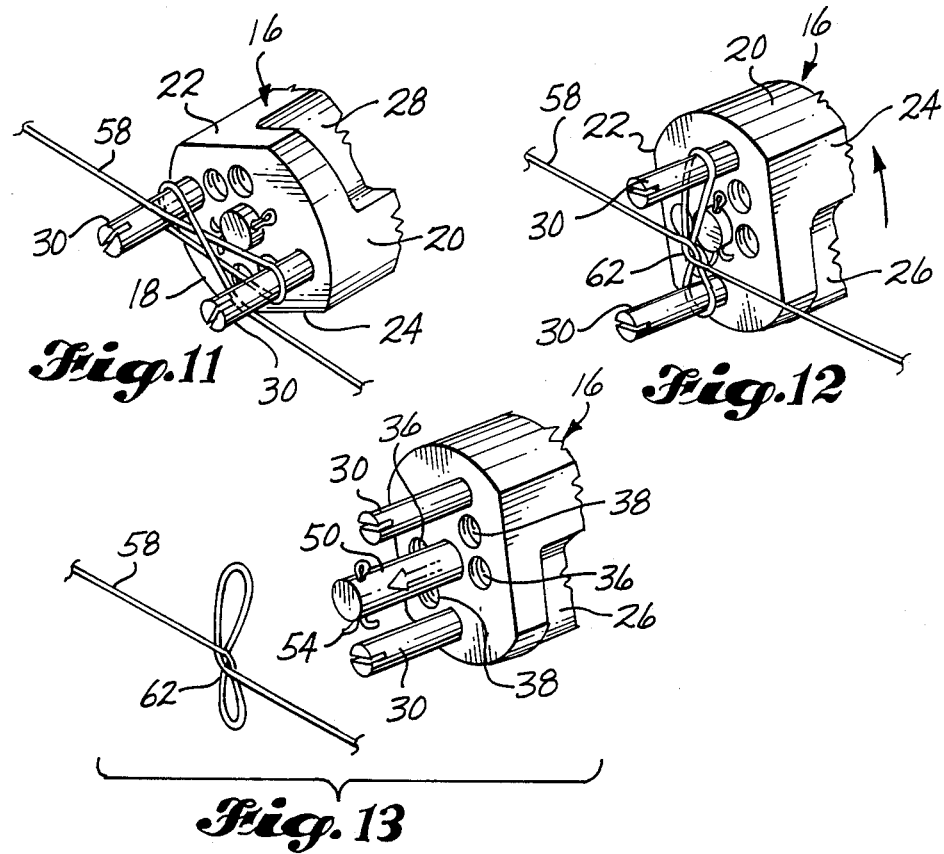

WIRE FENCE TAKE UP DEVICE

BACKGROUND OF THE INVENTION

The wires extending between fence posts seem to continuously become stretched and then become slack. Often this is due to farm animals leaning against the fence. Whatever the reason, it often becomes necessary to take up the slack in the wires. It is time consuming to remove the fasteners on the fence posts, stretch the wires and then refasten the wires to the posts. It is much quicker and cheaper to take up the slack in the wire by twisting and then securing the twisted wire together. There are many known devices to accomplish this. Those devices twist the wire then secure the twisted wire together to take up the slack. With those devices it is usually difficult to secure the twisted wire while handling the device, and it is difficult to remove the device from the secured wire.

SUMMARY OF THE INVENTION

The principal object of this invention is to provide an efficient to use and an efficient to remove unit for taking up slack in a wire fence.

To accomplish the foregoing object a shaft has a handle on one end and a head with outwardly extending prongs at the other end. A spring held plunger is mounted in the shaft and head to move the unit away from a retained twisted wire.

DESCRIPTION OF THE DRAWINGS

FIG. 1 shows a perspective view of this invention.

FIG. 2 shows an exploded perspective view of this invention.

FIG. 3 shows a partial end view of this invention.

FIGS. 4 through 8 each show a fragmented perspective view with each view showing a different step in this invention for taking up slack in a wire.

FIG. 9 shows a fragmented perspective view as in FIG. 8, but with the addition of a wire clamping device.

FIG. 10 shows a fragmented perspective view with a clamped wire being removed from the device.

FIG. 11 shows a fragmented perspective view in the next step beyond the view shown in FIG. 11.

FIG. 13 shows a fragmented perspective view with a twisted wire being removed from the device.

DETAILED DESCRIPTION

A fence tightening device 10, has a shaft 12, with a transversely extending handle 14, on one end and a head 16, on the other end. The head is preferrably oblong in shape with ends 18 and 20, and sides 22 and 24. The head is indented at 26, at the juncture between end 20 and side 22, and is also indented at 28 at the juncture of end 18 and side 24. A pair of prongs 30, are each threaded at 32 on one end and have a slot 34 on the other end to accept a screwdrive head. The head has three sets of threaded matching holes 36, 38, and 40. These holes are sized and threaded to accept the threaded ends of the prongs. Matching holes are aligned with the axis of the head and shaft, and preferably are aligned parallel to the sides of the head. To accomplish this one set of holes are located adjacent and parallel to side 22, and are located away from the indent 26. The other set of holes are located adjacent and parallel to side 24, and are located away from indent 28. The shaft and the head have an axially located hole 42, and the shaft has a larger countersunk hole 44, in the end away from the head. A plunger 46, has an enlarged end 48, a shank 50, sized to reciprocally move inside the hole in the shaft and head, and a hole 52, located near one end of the plunger. That hole is sized to accept a cotter pin 54, to retain the plunger in the axially located hole. A spring 56 fits over the shank, extends into the countersink hole 44, and acts to keep the plunger in position.

To set up the unit the spring 56 is placed on the shank 50, and the shank inserted into the hole 42 in the shaft 12. The plunger's enlarged end 48 is pressed against the spring, the cotter pin 54 inserted into hole 52, and the plunger released.

To make an adjustment in a fence one first decides just how much slack must be removed from each wire 58. Based on this, the prongs 30 are screwed into the appropriate set of matching threaded holes. This may be sets 36, 38 or 40 depending on the amount of takeup. First the prongs are placed over the extended wire as is shown in FIG. 4. Next the handle 14 is rotated 180 degrees into the position shown in FIG. 5. Then one of the prongs is twisted as shown in FIG. 6 to clear the extension of the wire, the unit rotated more, and the twisted prong advanced to the other side of the wire as shown in FIG. 7. These steps are repeated by first twisting the second prong away from the wire, rotating the unit, and then twisting the prong back into the position shown in FIGS. 9 and 11. In this position one may release the take up unit and secure the twisted wire in place. This may be by wrapping a wire around the twisted wire, or as is shown here one may use a hog ring 60, and secure it to the twisted wire with special pliers 62. Next one pushes the enlarged end 48 of the plunger 46 against spring 56 to move the plunger against the hog ring secured twisted wire and move the prongs 30 away from the wire.

In a preferred embodiment, and with the wire take up in the position as shown in FIG. 11, one rotates the prongs at least another 90 degrees to twist the wire into the position shown in FIG. 12. In that position the wire 58 is secured into a knot 62; so the plunger is pressed against the twisted wire as shown in FIG. 13 to move the prongs 30 away from the secured wire.

I claim:

1. A wire tightening tool, comprising
   a tool body;
   a pair of laterally spaced apart, substantially parallel prongs extending outwardly from said tool body, with a wire receiving space being defined by and between said prongs;
   said tool body including an opening positioned generally between said prongs, opening towards said wire receiving space,
   a push-off plunger slidably mounted in said opening, said plunger having an outer end portion, a retracted position in which said outer end portion is retracted from said space substantially into said body, and an extended position in which said outer end portion is moved outwardly from said body into said space,
   whereby in use the plunger is retracted and the tool is positioned to place the wire between the prongs, then the tool body is rotated to cause the prongs to twist wire, and then the plunger is extendable against the wire between the prongs, to move the prongs out from engagement with said wire.

2. A wire tightening tool according to claim 1, further comprising a spring which biases the plunger into its retracted position.

3. A wire tightening tool according to claim 1, further comprising a handle connected to said tool body.

4. A wire tightening tool according to claim 1, wherein said tool further comprises a shaft extending axially from the tool body and a handle connected to the shaft.

5. A wire tightening tool according to claim 1, wherein said tool body includes prong receiving openings and said prongs include inboard portions which are received within said openings.

6. A wire tightening tool according to claim 1, wherein said tool body includes a plurality of selectively usable prong receiving openings for at least a first of said prongs, each of which openings is spaced a different distance from the second prong, so that the distance between the prongs can be changed by selectively mounting the first prong in one of its openings.

7. A wire tightening device according to claim 1, comprising a plurality of prong receiving openings in said tool body, and wherein said prongs are removably secured within a selected pair of said openings, with the choice of openings being made to vary the lateral spacing of the prongs relative to each other.

8. A wire tightening tool according to claim 1, comprising prong receiving openings in said tool body, said openings being internally threaded, and said prongs including threaded inboard portions, each of which threaddedly engages a threaded opening for in that manner securing the prong to the tool body.

9. A wire tightening tool according to claim 8, comprising three or more prong receiving openings in the tool body, each of which is internally threaded to receive the threaded inboard portion of a prong, with the prongs being selectively secured within a pair of said openings, to in that manner vary the lateral spacing of the prongs.

10. A method of removing slack in a wire, comprising
providing a tool having a tool body, an axis of rotation, a pair of laterally spaced apart prongs extending from said tool body, substantially parallel to each other and the axis of rotation, and a retractable-extendable push-out plunger between the prongs;
retracting the push-out plunger and moving said tool toward a wire to place a portion of the wire between the prongs;
rotating the tool about said axis to move the prongs into engagement with the wire;
continuing rotation at least 180° so as to form a wire shortening bow in the wire having end loops engaging the prongs, said wire having lead-in and lead-out portions extending into and out from said bow, said lead-in portion passing under a first of the prongs, and then said wire in the bow region passing under the second prong, and then over the second prong and back to and under the first prong, then around and over the first prong, and then back over the second prong to said lead-out portion; and
extending the push-off plunger out from the tool, against the portion of the bow between the prongs, for pushing the tool away from the wire and the prongs out of engagement with the end loops of the bow.

11. A method according to claim 10, further comprising:
moving the tool to reposition the lead-in portion of the wire from a position below the first prong to a position above the first prong while maintaining engagement of the prongs and loops, and then moving the tool to reposition the lead-out section of wire from a position above the second prong to a position below the second prong while maintaining engagement of the prongs and loops.

12. A method according to claim 11, comprising, after the repositioning, rotating the tool an additional amount until the wire is sufficiently taut, and then extending the push-off plunger to remove the tool from the wire.

13. A method according to claim 10, comprising adjusting the lateral distance between the prongs before engaging the wire, to in that manner determine the bow length.

14. A method of removing slack in a wire, comprising:
providing a tool having a tool body, an axis of rotation, a pair of laterally spaced apart prongs extending from said tool body, substantially parallel to each other and the axis of rotation;
moving said tool toward a wire to place a portion of the wire between the prongs;
rotating the tool about said axis to move the prongs into engagement with the wire;
continuing rotation at least 180° so as to form a wire shortening bow in the wire having end loops engaging the prongs, said wire having lead-in and lead-out portions extending into and out from said bow, said lead-in portion passing under a first of the prongs, and then said wire in the bow region passing under the second prong, and then over the second prong and back to and under the first prong, then around and over the first prong, and then back over the second prong to said lead-out portion;
moving the tool to reposition the lead-in portion of the wire from a position below the first prong to a position above the first prong, while maintaining engagement of the prongs and loops, and then moving the tool to reposition the lead-out section of wire from a position above the second prong to a position below the seconf prong while maintaining engagement of the prongs and loops,
then rotating the tool an additional amount until the wire is sufficiently taut, and
then removing the tool from the wire.

15. A method according to claim 14, comprising adjusting the lateral distance between the prongs before engaging the wire, to in that manner determine the bow length.

* * * * *